June 25, 1940.　　　　　A. L. FISCHER　　　　　2,205,689
TRACTION APPARATUS FOR MOTOR VEHICLES
Filed Nov. 6, 1939　　　3 Sheets-Sheet 3
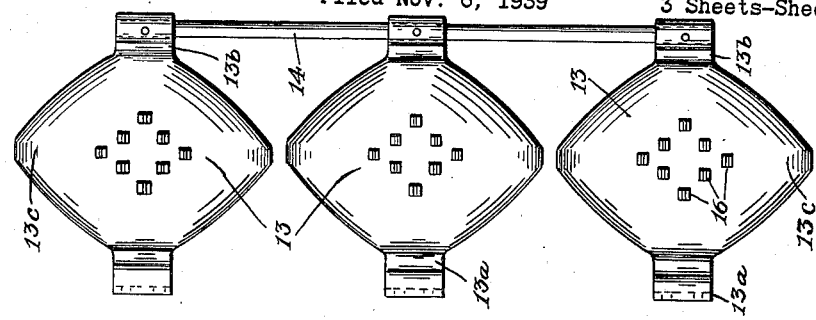
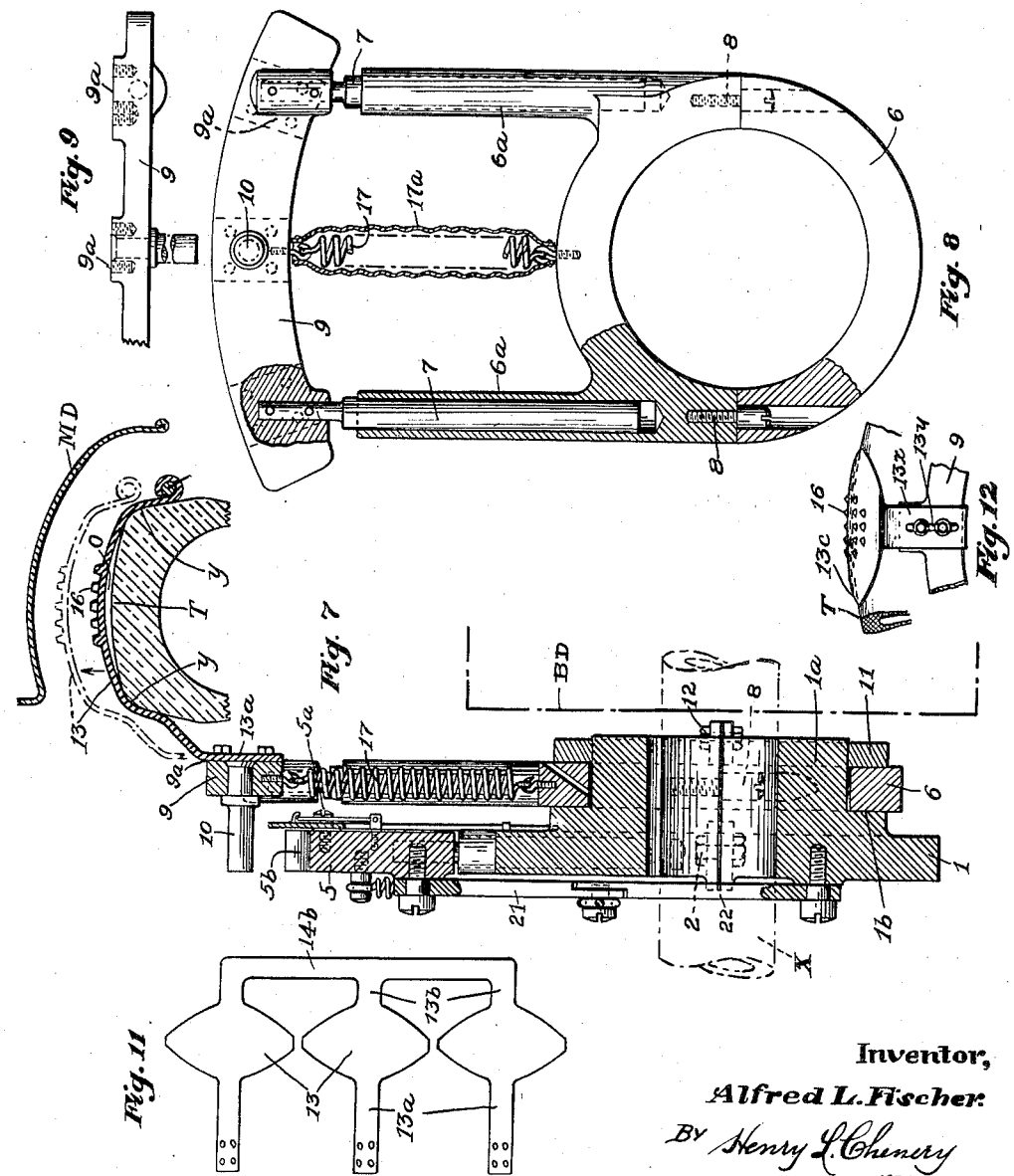
Inventor,
Alfred L. Fischer
By Henry L. Chenery
Atty.

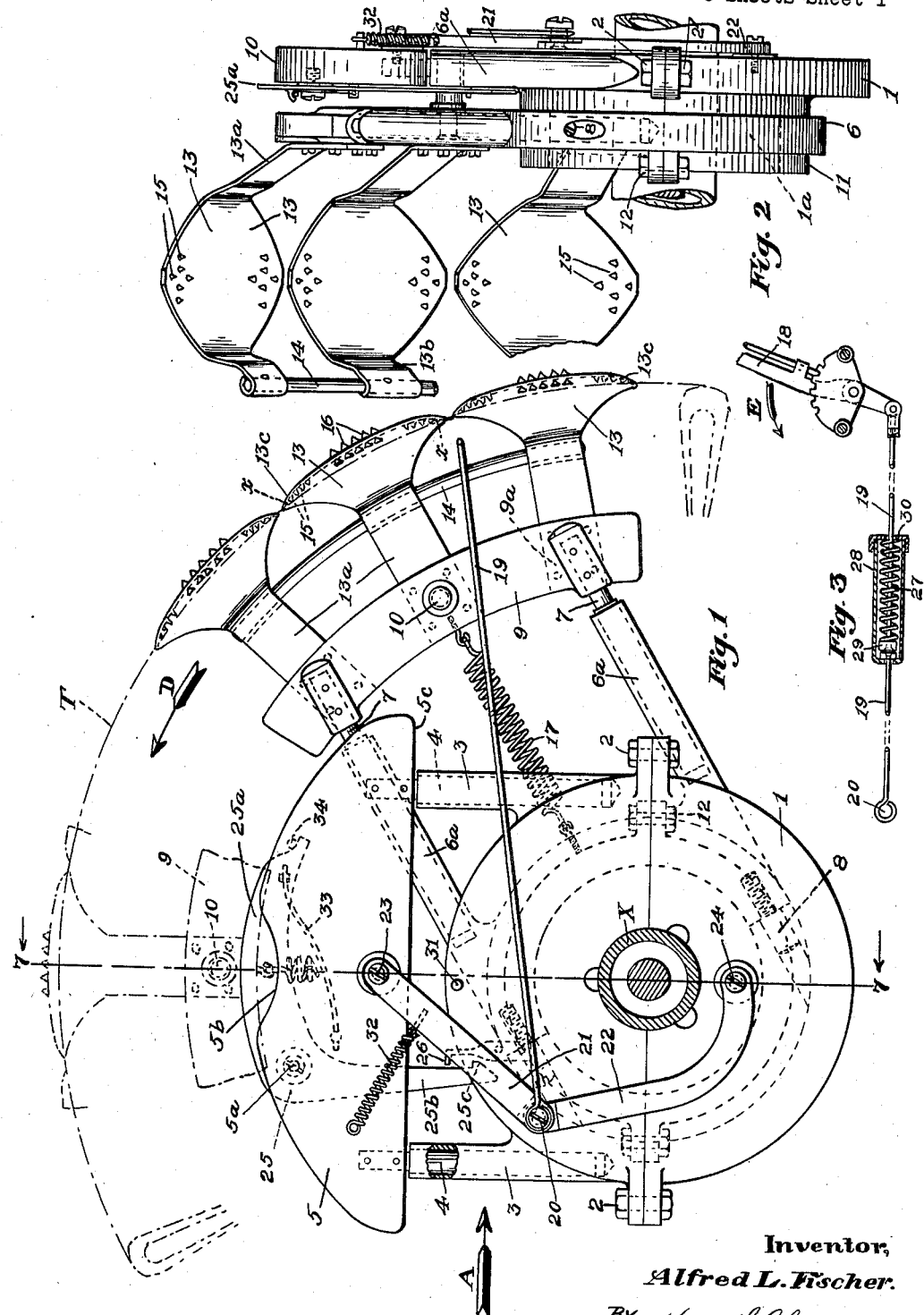

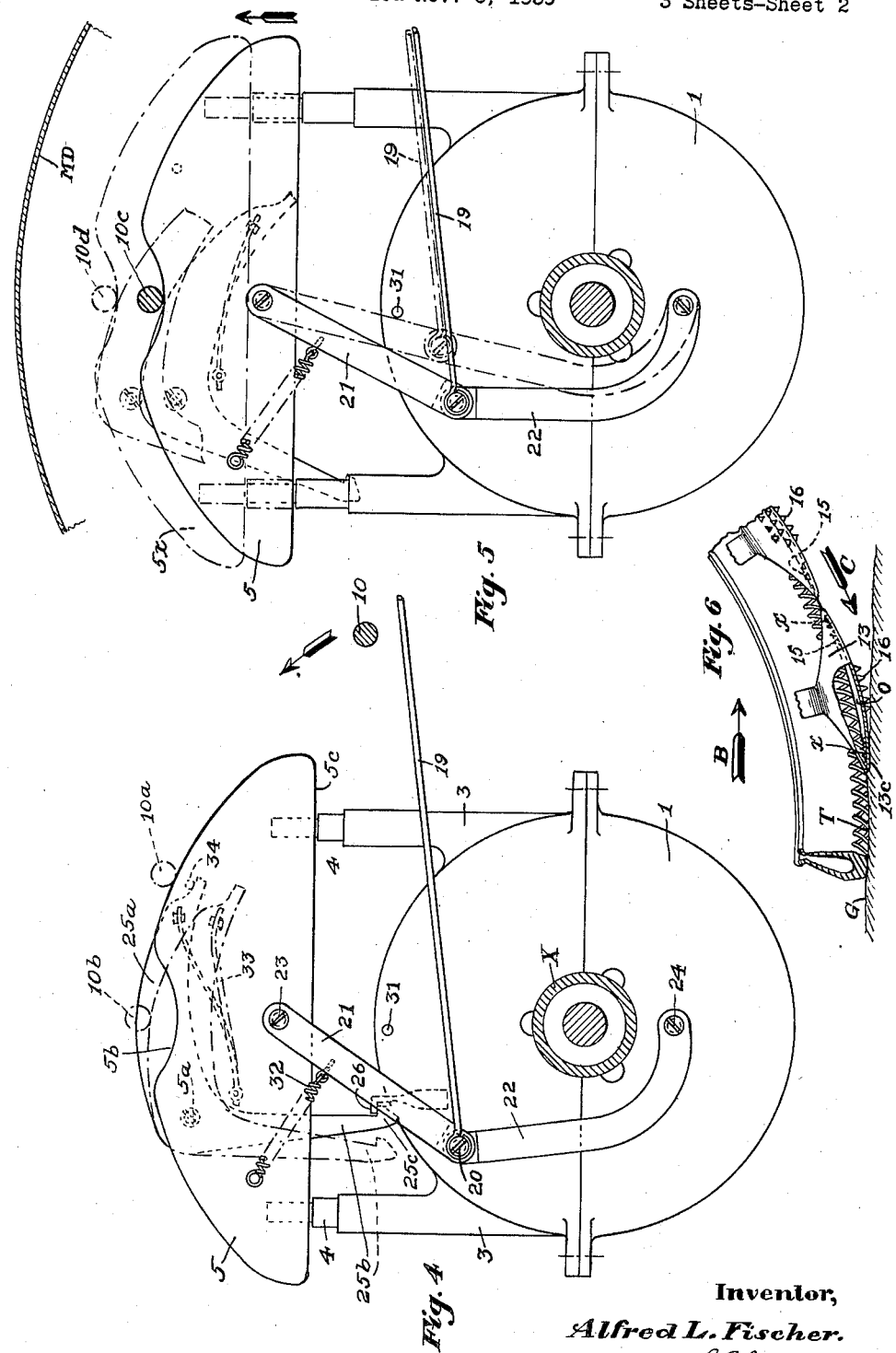

Patented June 25, 1940

2,205,689

UNITED STATES PATENT OFFICE 2,205,689

TRACTION APPARATUS FOR MOTOR VEHICLES

Alfred L. Fischer, Portland, Maine

Application November 6, 1939, Serial No. 303,099

8 Claims. (Cl. 152—214)

The invention hereinafter to be described relates, generally, to traction devices for motor vehicle tires, but deals more specifically with apparatus which may be installed on the rear axle housing and so arranged that it may instantly be put into or out of operation from the driver's seat.

When not in active service the traction elements may be conveniently stored in the space between the tire and the mud-guard of the vehicle.

I am aware of the fact that, heretofore, others have undertaken to evolve a satisfactorily operating mechanism, seeking the same objectives as I have in my present invention; but insofar as I have knowledge no workable and at the same time practicable combination has as yet been devised.

The conventional type of circumferential tire chain, or the transversely applied mud-hooks have not solved the problem, being very deficient on icy surfaces and objectionable for the reason that they soon wear out when used on paved or cement road surfaces.

In the snow-belt portions of the country the highways are usually well broken out immediately after each storm, leaving the surface of the road practically bare. Winds, however, undo the work of the highway departments by returning the snow to the road-bed in many places, making the use of some sort of traction device necessary.

Even so, it remains a fact that a preponderant portion of the highway could be negotiated without traction aids, but because portions of the road, even though a very small part of the whole, require their use, the vehicle must be equipped with them before the motorist starts on his trip.

And it will be apparent to those having knowledge of such matters that putting on and taking off tire chains, according to the demands and requirements of the road conditions met with, would be a very irksome task, to avoid which the average motorist would keep them on throughout his trip with the result that the life of the chain would be very brief.

Cognizant of the fact that the present-day, conventional type of traction device does not fully qualify, and that there seems to be a growing demand for a mechanical arrangement which can be thrown into and out of action instantly, at the will of the operator of the vehicle, I have conceived an idea which I have put into practice and demonstrated its feasibility.

The apparatus, supplied in two units, one for each rear wheel of the vehicle, is attached to the rear-axle housing. The traction element itself may be positioned on the periphery of the tire in response to a simple movement of a lever operated from the driver's seat, and a reverse movement of this lever disengages the traction element from the tire and houses it between the tire and the mud-guard.

As the brake-drums are usually integral with the axle housing it is necessary to provide the parts to be rigidly attached to the vehicle in halves, bolting them together. They may thus be readily removed at the end of the winter season, if thought desirable, or they may remain on the motor vehicle as an accessory therefor.

The primary object of my invention is to provide an efficient traction device. Another object, of slightly less importance, concerns its ability to be placed in and out of commission from the driver's seat. And a third resides in its economical operation.

For a clearer understanding of the import of my invention, reference should be had to the description found in the following specification, taken in connection with the accompanying drawings disclosing a preferred embodiment thereof.

In the drawings, in which like reference characters are employed to identify like parts:

Fig. 1 is a side elevation of my traction apparatus, the traction-shoe being shown engaging the tire;

Fig. 2 is an end elevation thereof, as viewed from arrow A, Fig. 1;

Fig. 3 is a detail dealing with the actuating lever and toggle-bar operating rod;

Figs. 4 and 5 show, diagrammatically, progressive steps taken to move the traction-shoes from the tire;

Fig. 6 illustrates the action of the traction-shoe as it first contacts the ground surface;

Fig. 7 is a sectional elevation of the device, the section being taken on line 7—7, Fig. 1, with the traction-shoe shown on the top of the tire;

Fig. 8 is a side elevation of the traction-shoe-carrying frame;

Fig. 9 is a fragmentary plan view of Fig. 8;

Fig. 10 is an outside plan view of the traction-shoes, "not bent to fit the tire";

Fig. 11 shows the blank for an alternate form of traction-shoe, and

Fig. 12 illustrates the shank portion of an adjustable traction-shoe.

In Fig. 1 of the drawings I have shown a side or face view of my traction apparatus, as viewed from the inside looking outwardly toward one end of the axle.

The dot and dash lines T partially define the peripheral portion of a tire, and X shows, in full cross section, the rear axle housing upon which the apparatus is primarily supported.

Secured to this rear axle housing is a split, flanged-hub or sleeve member 1, the two parts of which are clamped together by bolts 2.

Rising on opposite sides, respectively, of the flange portions of this member 1 are two small, axially parallel cylinders 3, in each of which is reciprocably disposed a plunger 4. The tops of the two plungers are interconnected by a crossbeam 5 which is subject to radial but not rotatable movement.

Continuing outwardly along the housing from the flange portion is a machined turned sleeve portion 1a on which is mounted a rotatable traction-shoe-carrying frame structure, embodying a ring 6 with a cylinder 6a on each side, and in each cylinder a plunger 7. The ring 6 is split and the two halves are mutually joined by bolts 8.

The upper ends of plungers 7 are interconnected by a traction-shoe-carrying plate 9 having on its inner face a traction-shoe-lifting stud 10.

One side of the ring 6 thrusts on the shoulder 1b of the sleeve 1a, and the opposite side on the split thrust collar 11, the two parts of which are clamped to the sleeve 1a by bolts 12.

Members 1, 1a and 11 are fixed against rotation, but the split ring 6 may revolve on the sleeve 1a.

It will be noted that the two sets of cylinders 3, 3, and 6a, 6a, serve as the guide members, and the cooperating sets of plungers, 4, 4, and 7, 7, respectively, are the guided members in the two mechanisms. It is obvious, however, that various other forms of structure might be employed for this purpose, one of which would be side seams loose enough for the parts to easily slide.

In Fig. 10 I illustrate in outside plan view my traction-shoe structure. It comprises a plurality of diamond shape plates 13, arcuate both longitudinally and transversely. Each plate is equipped with an inside hanger 13a which is secured to the face 9a of the plate 9, and with an outside hanger 13b fixed to a tie-rod 14, as shown. An alternate construction (see Fig. 11), would be to make the plates, the inner and outer hangers and the outer connecting bar 14b—corresponding to the tie-rod 14—of a one-piece stamping.

It will be observed by reference to Figs. 6 and 7 that the traction-shoes or plates 13 normally contact the tire at the points x, x, and y, y, leaving the central portion of the plate slightly spaced from the surface of the tire, as seen at O.

On the inside of the plate 13, at each end thereof, are small tire-gripping elements 15, and on its outer, central portion are larger, ground-gripping members 16. It is to be particularly noted that the outside end portions of the shoe plates are smooth. By reference to Fig. 6 the object of this construction will be apparent.

Assume that the tire T is advancing in the direction indicated by arrow B, and rotating as indicated by arrow C. When the shoe 13 is about to contact the ground G, its smooth outside end portion 13c offers practically no resistance to wedging itself under the tire, aided as it is by the inside, tire-gripping elements 15. When the shoe has moved directly under the center of the tire the weight of the vehicle causes the tire to slightly straighten out the shoe plate, and this results in the gripping elements 15 more firmly and positively engaging the surface of the tire, largely eliminating slippage between the contacting members.

But there is another element, the spring 17, which being always under tension is largely relied upon to hold the shoe plates 13 in strong engagement with the tire surface when the device is in active service. This spring may, if desired, be protected by a flexible sheath 17a.

Thus the two forces, the power of the spring 17 and the slip-resisting action of the elements 15, combine to secure the shoe plates to the tire and give to the outside ground-gripping elements 16 a maximum driving power for the traction apparatus.

It will be understood, of course, that the gripping elements 15 are so constructed as to avoid injury to the tire, their function being to simply indent the more or less soft rubber of the tire rather than puncturing it.

In describing the action of my traction apparatus reference should first be had to Fig. 1 which shows one of the traction-shoe units, composed preferably of three plates although this may be varied, tightly bound to the tire T by the spring 17.

As the tire revolves in the direction of arrow D the shoe can freely revolve in its orbit, contacting the ground at each revolution of the wheel, the traction-shoe lifting stud 10 clearing the beam 5 and its associated parts, as seen in dot and dash lines at the top of the Fig. 1.

Assume that a motorist is travelling over a highway on which there are snow-covered stretches alternating with bare sections of roadbed. When he approaches a snow-covered portion of the road he will require the traction apparatus, but further along he may come upon a long stretch of bare, hard surfaced highway. He has at his immediate command facilities for putting the apparatus into service or out of service according to and as conditions present themselves.

Having passed the snow-covered portion of the highway, the motorist will now proceed to put the traction element temporarily out of service by actuating the lever 18 in a direction indicated by arrow E, Fig. 3, the lever which is of the ratchet type being placed where it is easily accessible from the driver's seat.

This act places a strain on and movement of the toggle-bar rod 19, the end thereof, opposite the ratchet lever, being pivotally secured at 20 to the inner ends of the toggle-bars 21 and 22, the former of which has connection with the beam 5 at 23, and the latter pivotally secured on the disc 1, at 24.

The foregoing operation has the effect of slightly straightening out the toggle-bar members and at the same time raises the beam 5 from the Fig. 1 to the Fig. 4 position, bringing it into the path of the stud 10 which has orbital movement with the traction-shoe parts.

It will be observed that the stud 10 starts to ride the top face of the beam 5, but in its forward movement it also rides the top of a latch and trip member 25, pivotally mounted at 5a on the outer side of the beam. The horizontal portion 25a of the angular member 25 I designate as the trip arm, and the vertical portion 25b as the latch arm.

The trip arm normally rises above the radius of the top surface of the beam were its circular form extended uninterrupted to the vertical central line 7—7. But this radius line is broken adjacent the top of the beam, leaving a depression 5b for purposes to be hereinafter explained.

On the latch arm 25b is a latch hook 25c which, when the parts are arranged as shown in Fig. 1, is spaced at a considerable distance below the stop bracket 26 but which engages this bracket upon the first movement of the ratchet lever 18 just described. The stop bracket 26 is fixedly secured to the outer face of the disc 1 and is, therefore an immovable part of the device.

One function of this latch structure is to prevent the beam 5 rising to a position where the stud 10 might engage its under edge 5c, incident to undertaking the first portion of the beam-lifting operation. And to clarify the description, it might be well to state that the raising of the beam 5 is, in reality, a single complete operation from the time the traction-shoe is released from the tire until it is housed under the mud-guard MD.

To make it somewhat more understandable I have chosen to describe the operation by dividing it into consecutive but continuous steps. I have also, for the purpose of simplifying the drawing, made the stud 10 representative of the whole swinging frame and traction-shoe parts in Figs. 4 and 5.

After the toggle-bar members have raised the beam 5 into the position in which it is depicted in Fig. 4, the stud 10 has just begun to ride the face of the beam at 10a. But continuing movement of the stud to position 10b, makes it also ride the trip arm 25a and lower it sufficiently to swing the latch hook 25c off the stop bracket 26 which would permit further upward movement of the beam.

The next portion of the continuous upward movement of the beam 5 brings the stud 10 to position 10c, in the depression 5b, the relative positions of the parts now being as shown in full lines, Fig. 5, the toggle-bars undergoing a still further straightening out.

The traction-shoe has now been raised sufficiently to give a safe margin of clearance between the tire and the shoe; but to insure against all contingencies I still further raise the beam 5 and the stud 10, into positions 5x and 10d respectively.

The traction-shoe at this time is locked in its extreme upward position by the lever 18 which applies a yieldable tension on the rod 19 through the agency of the conventional arrangement shown in Fig. 3, wherein the rod 19 is broken, and a spring 27 housed in a casing 28 thrusts on a collar 29 secured to one end of the rod and on the casing cover 30 to provide yieldable extensibility to the rod structure.

When the final lifting operation, or the operation as a whole has been completed, the toggle-bar 21 engages a stop-pin 31 and no further uplift of the beam can be made. When the toggle-bar 21 is in dot and dash line position, Fig. 5, and thrusting on the stop-pin 31, the lever 18 is so positioned and held by the ratchet structure that more or less compression of the spring 27 takes place. The toggle-bars are thus yieldably maintained in a stopped position and this takes care of any slackness which otherwise might occur with a positive type connection between the parts.

It will be noted that the points 20, 23 and 24 are never in alignment, so the toggle-bar pivotal points are never on dead center.

To return the toggle-bars from their stopped to their original positions (or from their dot and dash line positions in Fig. 5 to their full line positions in Fig. 1) I employ a spring 32 one end of which is secured on the beam 5 and the other on the toggle-bar 21.

A wire spring element 33, one end of which is secured on the beam 5 and the other end having connection with the trip arm 25a, serves to swing the latch arm 25b into engagement with the stop bracket 26 at the proper time. A stop-pin 34 acts to prevent the latch arm being positioned on the right of the stop bracket 26, when viewing the apparatus as depicted in Fig. 1.

In Fig. 12 is shown a slightly modified form of traction-shoe hanger, 13x, having a slotted hole 13y which permits a certain amount of extensibility or contractibility in the parts to accommodate the structure to various diameters of tires. And in Fig. 7 the heavy dot and dash lines represent the face and one side of the brake drum, DD, space being provided within which to mount the elements having to do with operating the brake.

From the foregoing description it is thought to be apparent that a traction device constructed in accordance with my invention is particularly well adapted for use by reason of the convenience and facility with which it may be operated, not only over straight away courses of highways but in cramped positions along the curbing of city streets. The fact that with my design of traction device it can be attached to the vehicle at the beginning of the winter season and left to remain throughout the cold weather, putting it into service at such times only as it is required, saves an enormous amount of labor over the conventional type of chain, which requires to be constantly put on and taken off, saves also on the wear of the traction device itself, and is instantly available when needed, gives to the apparatus such merit as will commend itself to those who have once used it.

It is obvious that my invention is susceptible of various changes and modification without departing from the principles and spirit thereof. For this reason I do not wish to be understood as limiting myself to the precise mechanical detail and arrangement of parts herein shown in carrying out my invention in practice except as hereinafter claimed.

What I claim is:

1. In traction apparatus for motor vehicle wheels the combination with a rear axle housing and a vehicle tire, of a non-rotatable hub member fixed to said rear axle housing, a cross-beam mounted on said hub member, means for locating said cross-beam on said hub member in various predetermined radial positions distant from said axle housing, a traction-shoe-carrying frame mounted in its entirety for rotation on said hub member, a traction-shoe element secured at one end to said traction-shoe-carrying frame, the ground-contacting portion of said element aligning with and over-hanging said tire, and yieldable pressure means constantly acting to draw said traction-shoe element into engagement with the tread of the tire.

2. In a traction apparatus for motor vehicle wheels comprising in combination with a rear axle housing and tires for said wheels, a split sleeve fixed on and adjacent each end of said axle housing, a cross-beam mounted on said sleeve and susceptible of movement thereon transversely of said rear axle housing, toggle-bars interconnecting said sleeve and said cross-beam, a toggle-bar rod for actuating said toggle-bars, a spring normally tending to draw said cross-beam toward said sleeve, and a latch preliminarily limiting the outward, radial movement of said cross-beam during the first portion of the movement of said toggle-bar rod toward aligning said togglebars.

3. In a traction device for motor vehicles the combination with a rear axle housing and a wheel tire, of a flanged sleeve member fixed on said axle housing, a cross-beam on said flanged sleeve member, susceptible of radial movement, only, thereon, a traction-shoe-carrying frame adapted to rotate around said flanged sleeve member, said frame including a ring, a traction-shoe-attaching plate movable radially on said traction-shoe-carrying frame, and a spring tending to bias the movement of said attaching plate in one direction normally drawing the traction-shoe on to said tire, a lifting-stud in said attaching plate, a lifting-stud locking depression in the upper face of said cross-beam, and means, operable by the driver of the vehicle, predeterminately to move said cross-beam into the path of travel of the lifting-stud and cause said traction-shoe to be forced from the tire, or conversely, to permit said cross-beam to recede toward the axle housing and thereby allow the traction-shoe to draw into close engagement with the tire.

4. In a traction apparatus for a motor vehicle wheel the combination with a rear axle housing and a vehicle tire, of a split, flanged-hub member, means to fixedly secure said flanged-hub member to said rear axle housing, a cross-beam associated with said flanged-hub member, interconnected guide elements on said flanged-hub member and said cross-beam, enabling movements of said cross-beam, in directions toward and from said rear axle housing, to be made, a traction-shoe-carrying frame revolubly mounted on said flanged-hub member, a traction-shoe secured to and extending outwardly from said traction-shoe-carrying frame, a traction-shoe-lifting stud on said traction-shoe-carrying frame adapted at predetermined times, to be engaged by said cross-beam to the end that said traction-shoe may be forced off the tire, a toggle-bar unit, embodying two members mutually and pivotally joined, with their outer ends pivotally connected to the said split, flanged-hub member and said cross-beam, respectively, and an actuating rod making connection with said toggle-bar unit, and manipulated by the operator of the vehicle.

5. In a traction device for a motor vehicle wheel, the combination with a rear axle housing and a tire for said wheel, of a sleeve fixed on said rear axle housing, a cross-beam mounted for limited radial movement on said sleeve, means to radially move said cross-beam, a traction-shoe-carrying frame revolubly mounted on said sleeve, a traction-shoe lifting stud in said traction-shoe-carrying frame, adapted, when the device is operating, to revolve with the tire, a traction-shoe, one side of which is yieldingly secured to said traction-shoe-carrying frame, the traction shoe proper revolving in a vertical plane coincident with that of the tire, a spring normally tending to hold said traction shoe in engagement with said tire, toggle-bars interconnecting said cross-beam and said sleeve, and means to actuate said toggle-bars to the end that the face of said cross-beam may be brought into the path of rotation of said traction-shoe-lifting stud, and thereby cause said traction-shoe to be moved from the face of the tire, and suspended in space thereabove.

6. In a traction device for the tire of a motor vehicle the combination with a rear axle housing, of a cross-beam fixed on said housing and having a convex face interrupted by a depression therein, means to raise and lower said cross-beam various distances from said housing, a traction-shoe-carrying frame mounted to revolve around said rear axle housing, a traction-shoe, having connection with said traction-shoe-carrying frame, disposed in the plane in which rotates said tire, a spring normally drawing said traction-shoe toward said tire and at predetermined times to bring it into strong engagement therewith, a traction-shoe-lifting stud in said traction-shoe-carrying frame adapted, when said cross-beam is brought into engagement therewith to raise said traction-shoe off said tire, and means to predeterminately maintain said traction-shoe in its off-the-tire position.

7. A traction apparatus for a motor vehicle wheel tire comprising in combination with the rear axle housing for said vehicle, a cross-beam mounted superjacent said rear axle housing, means to raise and lower said cross-beam, said means being operable from the driver's seat, a traction-shoe-carrying frame mounted to revolve around said housing, a traction-shoe adjustably secured to said traction-shoe-carrying frame and disposed in the plane of said tire, said traction-shoe embodying a two-way-arcuate plate of substantially diamond shape, having smooth outside end surfaces and coarse, ground-gripping elements on its centrally disposed surface with fine tire engaging elements, a spring normally drawing said traction-shoe toward the tire, and a lifting stud on said traction-shoe-carrying frame adapted to be engaged by said cross-beam when said cross-beam is raised for the purpose of disengaging said traction-shoe from said tire.

8. A device of the class described adapted for mounting on the rear axle housings of a motor vehicle having tires thereon, comprising a hub portion on each of said rear axle housings, a machine-turned part on each of said hub portions, a cross-beam mounted on said hub portion, means to reciprocate said cross-beam to and from said hub portion, a traction-shoe-carrying frame mounted to revolve on said machine-turned portion of said hub portion, a traction-shoe unit structure yieldingly mounted on said frame and disposed in a plane in which rotates said tire, a traction-shoe-lifting stud in said frame, said stud travelling in an orbit in which lies said cross-beam, means to bring said cross-beam into and out of engagement with said stud, said operation being performed from the vehicle driver's seat, a spring adapted to provide a constant tension on said traction-shoe tending to hold it in engagement with the said tire, and means on said cross-beam for seating said traction-shoe-lifting stud, when raised by said cross-beam, the seating of said stud in said seat maintaining the traction-shoe out of contact with the tire.

ALFRED L. FISCHER.